(12) United States Patent
Oliver et al.

(10) Patent No.: US 8,838,664 B2
(45) Date of Patent: Sep. 16, 2014

(54) METHODS AND APPARATUS FOR COMPRESSING PARTIAL PRODUCTS DURING A FUSED MULTIPLY-AND-ACCUMULATE (FMAC) OPERATION ON OPERANDS HAVING A PACKED-SINGLE-PRECISION FORMAT

(75) Inventors: David Oliver, Longmont, CO (US); Debjit Dassarma, San Jose, CA (US); Hanbing Liu, Austin, TX (US); Scott Hilker, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 603 days.

(21) Appl. No.: 13/172,590

(22) Filed: Jun. 29, 2011

(65) Prior Publication Data

US 2013/0007075 A1   Jan. 3, 2013

(51) Int. Cl.
*G06F 7/38* (2006.01)
*G06F 7/52* (2006.01)
*G06F 7/483* (2006.01)
*G06F 7/544* (2006.01)

(52) U.S. Cl.
CPC .............. *G06F 7/483* (2013.01); *G06F 7/5443* (2013.01)
USPC .......................................... 708/523; 708/629

(58) Field of Classification Search
CPC ... G06F 7/5338; G06F 7/5318; G06F 7/5324; G06F 7/5443; G06F 2207/3884
USPC .......................................... 708/523, 629, 501
See application file for complete search history.

(56) References Cited

U.S. PATENT DOCUMENTS

| | | | | |
|---|---|---|---|---|
| 6,532,485 | B1 * | 3/2003 | Wang | 708/523 |
| 7,149,768 | B2 * | 12/2006 | Dahan et al. | 708/709 |
| 7,424,505 | B2 | 9/2008 | Peleg et al. | |
| 7,430,578 | B2 | 9/2008 | Debes et al. | |
| 7,493,357 | B2 * | 2/2009 | Dhong et al. | 708/503 |
| 7,840,628 | B2 * | 11/2010 | Kurd | 708/625 |
| 8,099,450 | B2 * | 1/2012 | Kurd | 708/629 |
| 8,316,071 | B2 * | 11/2012 | Hurd et al. | 708/523 |
| 2009/0265409 | A1 | 10/2009 | Peleg et al. | |
| 2010/0125620 | A1 | 5/2010 | Oliver et al. | |
| 2010/0125621 | A1 | 5/2010 | Oliver et al. | |

* cited by examiner

*Primary Examiner* — Tan V. Mai
(74) *Attorney, Agent, or Firm* — Park, Vaughan, Fleming & Dowler, LLP

(57) ABSTRACT

The disclosed embodiments relate to methods and apparatus for accurately, efficiently and quickly executing a fused multiply-and-accumulate instruction with respect to floating-point operands that have packed-single-precision format. The disclosed embodiments can speed up computation of a high-part of a result during a fused multiply-and-accumulate operation so that cycle delay can be reduced and so that power consumption can be reduced.

26 Claims, 4 Drawing Sheets

METHODS AND APPARATUS FOR COMPRESSING PARTIAL PRODUCTS DURING A FUSED MULTIPLY-AND-ACCUMULATE (FMAC) OPERATION ON OPERANDS HAVING A PACKED-SINGLE-PRECISION FORMAT

TECHNICAL FIELD

Embodiments of the subject matter described herein relate generally to data processing, and to data processors that execute instructions. More particularly, embodiments of the subject matter relate to arithmetic processing devices for executing a floating-point fused multiply-and-accumulate instruction with respect to operands that have packed-single-precision format and methods for implementing the same.

BACKGROUND

A processing core can include multiple data processors that execute program instructions by performing various arithmetic operations. Examples of arithmetic operations that can be performed by arithmetic processing units (APUs) of such processors include addition, multiplication, division, and the like. In addition, some APUs can support more complex operations. For instance, one example is a multiply-and-accumulate (MAC) operation that computes the product of two numbers and adds that product to another number. The numerical format of the numbers used in such a computation can vary depending on the implementation. Two common numerical formats are integer format and floating point format.

Floating Point (FP) Number Processing

Some data processor devices may include a specialized arithmetic processing unit called a floating-point (FP) processing device that can operate on operands that have a floating point numerical format. FP arithmetic is widely used for performing tasks such as graphics processing, digital signal processing, and processing associated with scientific applications. A FP processing device generally includes devices dedicated to performing specific operations with respect to floating point numbers, such as addition, multiplication, and division. These fundamental operations can be referred to herein as floating point add (FADD), floating point multiply (FMUL), floating point divide (FDIV), respectively.

Floating Point (FP) Multiply-and-accumulate (MAC) Operations

In addition, some APUs can be designed to support more complex FP operations such as a FP MAC operation. In a FP MAC operation, two FP operands (A and B) are multiplied and the product is added to a third FP operand (C) to generate a result. When a MAC operation is done with floating point numbers, the MAC operation can either be performed using two rounding steps, or using a single rounding step. Because floating point numbers have only a certain amount of mathematical precision, it makes a difference in the result whether the MAC operation is performed with two roundings, or with a single rounding.

Fused Multiply-and-accumulate (FMAC) Operation

When a FP MAC operation is performed with a single rounding, this operation is commonly referred to as a fused multiply-add (FMADD) or fused multiply-and-accumulate (FMAC). In other words, the entire sum C+A×B is computed to its full precision before rounding the final result down to N significant bits. In comparison to a processor that requires for a distinct multiply instruction to be performed followed by a distinct add instruction, a processor that includes an FMAC instruction in its instruction set may improve the speed and accuracy of many important computations that involve the accumulation of products, such as matrix multiplication, dot product calculation, or polynomial expansion. The FMAC operation may improve the accuracy because the result can be generated by performing a single rounding of the result rather than the two rounds that must be performed in the case of a distinct multiply instruction followed by a distinct add instruction. In the latter case, the product of the multiply is rounded; whereas, the FMAC instruction need not round the product before adding it to the third operand. Additionally, the FMAC instruction may improve the speed because a single instruction can generally be executed faster than two instructions.

Operand Formats

A floating-point processing device typically supports arithmetic operations on operands that use different number formats, such as single-precision, double-precision, and extended-precision formats. In addition, some floating-point processing devices support arithmetic operations on operands having a packed single-precision number format. An operand that has a packed single-precision number format contains two individual single-precision values.

It would be desirable to provide arithmetic processing devices and methods for implementing the same that can accurately, efficiently and quickly execute a fused multiply-and-accumulate instruction with respect to floating-point operands that have packed-single-precision format. It would also be desirable to speed up computation of a high-part of a result during a fused multiply-and-accumulate operation so that cycle delay can be reduced.

BRIEF SUMMARY OF EMBODIMENTS

The disclosed embodiments relate to methods and apparatus for accurately, efficiently and quickly executing a fused multiply-and-accumulate instruction with respect to floating-point operands that have packed-single-precision format. The disclosed embodiments can speed up computation of a high-part of a result during a fused multiply-and-accumulate operation so that cycle delay can be reduced and so that power consumption can be reduced.

In accordance with one embodiment, a method is provided for compressing a plurality of partial products during a fused multiply-and-accumulate (FMAC) operation.

During a first compression stage, the plurality of partial products, except for a last partial product, are compressed to generate first outputs (or output vectors). A logical one (1) value is inserted into a particular bit of a selected one of the first outputs to generate a modified first output. For example, the particular bit of the selected one of the first outputs can be changed from a logical zero (0) value to a logical one (1) value to add a logical one (1) value into the modified first output. In other words, the particular bit of the selected one of the first outputs that has a logical zero (0) value can be modified and set to a logical one (1) value. In one embodiment, the particular bit is a least significant bit (e.g., bit 80). For instance, in one non-limiting implementation, the least significant bit is bit 80 of the first output, and therefore bit 80 of the first output is set to a logical one (1) value to add a $2^{80}$ term to the first output such that the modified first output has an extra $2^{80}$ term.

During a second compression stage, the modified first output and other unmodified ones of the first outputs are compressed to generate second outputs, during a third compression stage, the second outputs are compressed to generate third outputs, and during a fourth compression stage, the third outputs are compressed to generate a fourth carry output and a fourth sum output.

An intermediate partial product is generated based on the last partial product. For example, when a specific bit in the last partial product has a logical zero (0) value, the intermediate partial product is the last partial product. By contrast, when the specific bit in the last partial product has a logical one (1) value, the specific bit in the last partial product is changed to be a logical zero (0) value during generation of the intermediate partial product. In one embodiment, the specific bit in the last partial product is a specific bit in the last partial product that is selected from bits 49 through 79 of the last partial product. In one implementation, the specific bit in the last partial product is a sign bit of the last partial product. For example, in an implementation where there are thirty-three partial products and the last partial product is a thirty-third partial product, the specific bit can be bit 62 of the thirty-third partial product.

The intermediate partial product, the fourth sum output, a first correction factor, and a second correction factor can then be compressed to generate a corrected carry output and a corrected sum output, and during a sixth compression stage, a carry output and a sum output can be generated based on an aligned addend, the fourth carry output, the corrected carry output, and the corrected sum output. The carry output and the sum output can then be used in subsequent stages to generate results of the FMAC operation.

In accordance with another embodiment, a fused multiply-and-accumulate (FMAC) processor is provided. The fused multiply-and-accumulate (FMAC) processor is configured to receive operands having packed single-precision format, and is configured to perform a multiply-and-accumulate operation on the operands. The operands comprise: a high-multiplicand operand (AH) and a low-multiplicand operand (AL), a high-multiplier operand (BH) and a low-multiplier operand (BL), and a high-addend operand (CH) and a low-addend operand (CL). The FMAC processor can perform the FMAC calculation using the three high operands to provide a high result, and can perform another portion of the FMAC calculation using the three low operands to provide a low result.

Among other things, the FMAC processor includes a plurality of registers, a Booth Encoder, and a compression tree.

The registers included within the FMAC processor include a register configured to receive a single-precision value corresponding to the high-multiplier operand (BH), and another register configured to receive and a single-precision value corresponding to the low-multiplier operand (BL).

The Booth encoder comprises a first input configured to receive a single-precision value corresponding to the high-multiplicand operand (AH), and a single-precision value corresponding to the low-multiplicand operand (AL), and a second input configured to receive a first value generated based on the single-precision value corresponding to the high-multiplier operand (BH) and a second value generated based on the single-precision value corresponding to the low-multiplier operand (BL). The Booth encoder is configured to generate a plurality of partial products based on the single-precision value corresponding to the high-multiplicand operand (AH), the single-precision value corresponding to the low-multiplicand operand (AL), the first value and the second value.

The compression tree includes a carry-save adder (CSA) array and a carry-save adder (CSA) coupled to the CSA array.

The CSA array is has inputs configured to receive the plurality of partial products, and includes a number of carry save adders (CSAs) implemented at different compressor levels for compressing the partial products. Each CSA receives four inputs and compresses them into a carry output and a sum output, where the sum of the carry output and the sum output is equal to the sum of the four inputs.

A first compressor level includes a plurality of first carry-save adders (CSAs) that are configured to compress the plurality of partial products except for the last partial product to generate first outputs. In one implementation, the first compressor level includes eight first carry-save adders (CSAs) that include the first carry-save adder (CSA). Each of the first plurality of first carry-save adders is configured to receive four of the plurality of the partial products and compress the four partial products to generate a carry output and a sum output. The sum of the carry output and the sum output generated by each particular one of the eight first carry-save adders (CSAs) is a vector equal to the sum of the four partial products (242) input to that particular one of the eight first carry-save adders (CSAs).

A modification module is designed to insert a logical one (1) value into a particular bit of a selected one of the first outputs of the first compressor level to generate a modified first output. For example, the particular bit of the selected one of the first outputs can be changed from a logical zero (0) value to a logical one (1) value to add a logical one (1) value into the modified first output. In other words, the particular bit of the selected one of the first outputs that has a logical zero (0) value can be modified and set to be a logical one (1) value. In one embodiment, a logical zero (0) value at bit 80 of the selected one of the first outputs is switched into a logical one (1) value.

A second compressor level includes a plurality of second carry-save adders (CSAs) that are configured to compress the modified first output and other unmodified ones of the first outputs (i.e., the first outputs other than the modified first output) to generate second outputs. One of the second carry-save adders (CSAs) is configured to compress three of the first outputs and the modified first output to generate two second outputs such that the logical one (1) value is forced into the particular bit by that particular CSA.

A third compressor level includes plurality of third carry-save adders (CSAs) that are configured to compress the second outputs to generate third outputs.

A fourth compressor level includes a fourth carry-save adder (CSA) that is configured to compress the third outputs to generate a fourth carry output and a fourth sum output.

A partial product modification module is configured to generate an intermediate partial product based on the last partial product. For example, when a specific bit in the last partial product has a logical zero (0) value, the intermediate partial product is the last partial product. By contrast, when the specific bit in the last partial product has a logical one (1) value, the specific bit in the last partial product is changed to be a logical zero (0) value during generation of the intermediate partial product. In one embodiment, the specific bit in the last partial product is a specific bit in the last partial product that is selected from bits 49 through 79 of the last partial product. In one implementation, the specific bit in the last partial product is a sign bit of the last partial product. For example, in an implementation where there are thirty-three partial products and the last partial product is a thirty-third partial product, the specific bit can be bit 62 of the thirty-third partial product.

A fifth compressor level includes a multiplication correction module that is configured to generate a corrected carry output and a corrected sum output based on a first correction factor, a second correction factor, the intermediate partial product and the fourth sum output. The multiplication correction module can be implemented via a carry-save adder (CSA) that compresses the first correction factor, the second correction factor, the intermediate partial product and the fourth sum output to generate the corrected carry output and the corrected sum output.

A sixth compressor level of the compression tree includes a sixth carry-save adder (CSA) coupled to the CSA array. The sixth CSA is configured to generate a carry output and a sum output based on an addend, the fourth carry output, the corrected carry output, and the corrected sum output. The carry output and the sum output can then be used in subsequent stages to generate results of the FMAC operation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
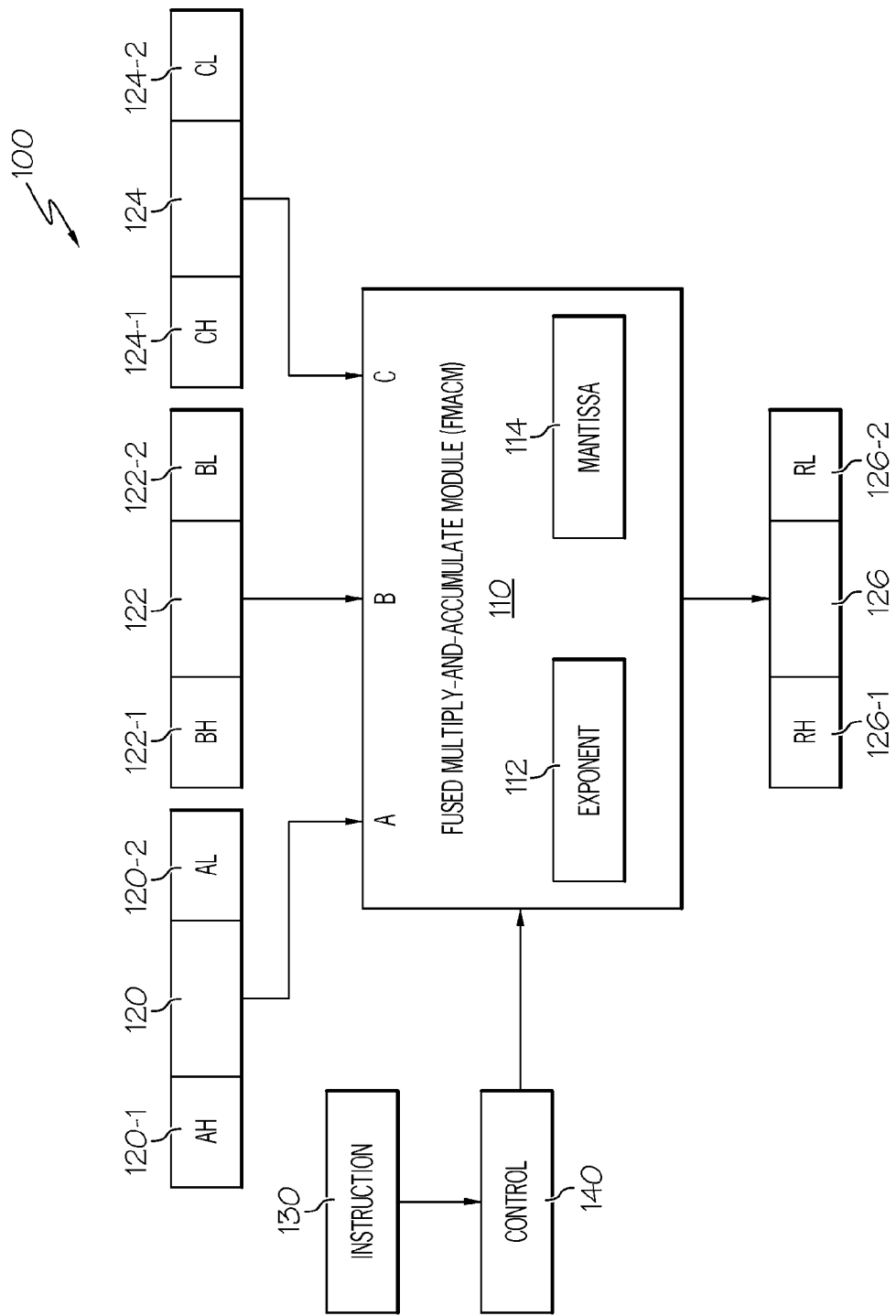
FIG. 1 is a block diagram illustrating the arithmetic processing unit in accordance with a specific embodiment of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to functional aspects of the devices and systems (and the individual operating components of the devices and systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment.

Definitions

As used herein, the term "instruction set architecture" refers to a part of the computer architecture related to programming, including the native data types, instructions, registers, addressing modes, memory architecture, interrupt and exception handling, and external I/O. An instruction set architecture includes a specification of a set of machine language "instructions."

As used herein, the term "instruction" refers to an element of an executable program provided to a processor by a computer program that describes an operation that is to be performed or executed by the processor. An instruction may define a single operation of an instruction set. Types of operations include, for example, arithmetic operations, data copying operations, logical operations, and program control operation, as well as special operations, such as permute operations. A complete machine language instruction includes an operation code or "opcode" and, optionally, one or more operands.

As used herein, the term "opcode" refers to a portion of a machine language instruction that specifies or indicates which operation (or action) is to be performed by a processor on one or more operands. For example, an opcode may specify an arithmetic operation to be performed, such as "add contents of memory to register," and may also specify the precision of the result that is desired. The specification and format for opcodes are defined in the instruction set architecture for a processor (which may be a general CPU or a more specialized processing unit).

As used herein, the term "operand" refers to the part of an instruction which specifies what data is to be manipulated or operated on, while at the same time also representing the data itself. In other words, an operand is the part of the instruction that references the data on which an operation (specified by the opcode) is to be performed. Operands may specify literal data (e.g., constants) or storage areas (e.g., addresses of registers or other memory locations in main memory) that contain data to be used in carrying out the instruction.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. In addition, certain terminology may also be used in the following description for the purpose of reference only, and thus are not intended to be limiting. For example, terms such as "first," "second," and other such numerical terms referring to elements or features do not imply a sequence or order unless clearly indicated by the context.

Exemplary Arithmetic Processing Unit Having a Fused Multiply-and-Accumulate (FMAC) Module FIG. 1 is a block diagram illustrating the arithmetic processing unit 100 in accordance with a specific embodiment of the present disclosure. Arithmetic processing unit 100 includes a fused multiply-and-accumulate module (FMACM) 110, operand registers 120, 122, 124, result register 126, an instruction register 130, and a control module 140. FMACM 110 further includes exponent module 112 and mantissa module 114. The operation of the mantissa datapath 114 will be explained in greater detail below with reference to FIGS. 2 and 3.

Floating-Point Numbers

In the illustrated embodiment of FIG. 1, it is assumed that FMACM 110 is implemented as a pipelined datapath and is compliant with IEEE-754 floating-point standards. A floating-point number includes a significand (mantissa) and an exponent. For example, the floating-point number $1.1011010*2^{15}$ has a significand of 1.1011010 and an exponent of 15. The most significant bit of the mantissa, to the left of the binary point, is referred to as an "implicit bit." A floating-point number is generally presented as a normalized number, where the implicit bit is a one. For example, the number $0.001011*2^{23}$ can be normalized to $1.011*2^{20}$ by shifting the mantissa to the left until a "1" is shifted into the implicit bit, and decrementing the exponent by the same amount that the mantissa was shifted. A floating-point number will also include a sign bit that identifies the number as a positive or negative number. The exponent can also represent a positive or negative number, but a bias value is added to the exponent so that no exponent sign bit is required.

FMACM 110 includes mantissa module 114 that performs mathematical operations on the mantissa of the received operands and includes exponent module 112 that performs mathematical operations on the exponent portions of the floating-point operands. Mantissa module 114 and exponent module 114 perform their operations in a substantially parallel manner.

Precision of Floating-Point Numbers, and Packed-Single-Precision Format

FMACM 110 can perform extended-precision, double-precision, and single-precision operations, and can also perform two single-precision operations in parallel using a "packed single" format. For purposes of discussion, it is assumed that the fractional component of the mantissa of a single-precision number has twenty-four bits of precision, a double-precision number has fifty-three bits of precision, and an extended-precision number has 64 bits of precision. A packed single format contains two individual single-precision values. The first (low) value includes a twenty-four bit mantissa that is right justified in the 64-bit operand field, and the second (high) value includes another twenty-four bit mantissa that is left justified in the 64-bit operand field, with sixteen zeros included between the two single-precision values.

Operand Registers and Operand Format

FMACM 110 has an input labeled "A" coupled to operand register 120, an input labeled "B" coupled to operand register 122, an input labeled "C" coupled to operand register 124, an input to receive a signal from control module 140, and an output to provide a result to register 126. FMACM 110 can use operands to perform an arithmetic operation as specified by an instruction in the instruction register 130 to generate a result that is provided to result register 126.

Operand registers 120, 122, and 124 can each contain data values that can be provided to FMACM 110. In general, these data values can be floating point numbers having either a single-precision, double-precision, extended-precision or packed single-precision format. In the embodiments that will be described below, each operand register 120, 122, 124 contains two single-precision operands in a packed single-precision format (i.e., two individual single-precision values separated by zeros). Because the FMACM 110 is configured to execute two concurrent single-precision operations, operand register 120 includes portions 120-1 and 120-2, operand register 122 includes portions 122-1 and 122-2, operand register 124 includes portions 124-1 and 124-2, and result register 126 includes portions 126-1 and 126-2.

Fused Multiply-and-accumulate Module (FMACM)

FMACM 110 is an arithmetic processing device that can execute arithmetic instructions such as multiply, add, subtract, multiply-add, and multiply-and-accumulate instructions. FMACM 110 can receive three inputs, A, B, and C. Inputs A and B are a multiplicand and a multiplier, respectively, and input C is an addend. To execute a multiply-add instruction, such as floating-point multiply-and-accumulate operation, operands A (INPUT1) and B (INPUT2) are multiplied together to provide a product, and operand C is added to the product. As will be described below, operand data can have a packed single-precision format in which the operand data is split into high and low portions or parts that are processed separately. In accordance with the disclosed embodiments, the FMACM 110 can perform a fused multiply-and-accumulate operation with improved accuracy, speed and/or efficiency. A multiply instruction, such as a floating-point multiply (FMUL), is executed in substantially the same way except operand C (INPUT3) is set to a value of zero. An add instruction, such as a floating-point add (FADD) is executed in substantially the same way except operand B is set to a value of one.

Instruction register 130 can contain an instruction (also referred to as an operation code and abbreviated as "opcode"), which identifies the instruction that is to be executed by FMACM 110. The opcode specifies not only the arithmetic operation to be performed, but also the precision of the result that is desired. Control module 140 has an input to receive an instruction from instruction register 130.

Control module 140 can receive the instruction from instruction register 130 and provide control signals to FMACM 110. For example, control module 140, upon receiving a fused multiply-and-accumulate (FMAC) instruction/opcode, can configure FMACM 110 to perform the indicated computation and to provide a packed single-precision result. Moreover, the control signal from the control module 140 can configure FMACM 110 to interpret each of input values A, B, C as representing an operand of any of the supported precision modes, and more specifically, in this case, as representing operands of the packed single-precision mode.

In accordance with the disclosed embodiments that will be described with reference to FIGS. 2 and 3, the instruction register 130 contains a fused multiply-and-accumulate (FMAC) instruction/opcode so that the FMACM 110 can execute a FMAC operation with respect to operands having a packed single-precision, floating point format. Accordingly, each input value provided to inputs A, B, and C of FMACM 110 from operand registers 120-124, contains two single-precision operands, a "high" operand and a "low" operand. In other words, each input value A, B, C represents two individual single-precision operands, and to illustrate this in FIG.

1, the operand register 120 includes portions 120-1 and 120-2, operand register 122 includes portions 122-1 and 122-2, operand register 124 includes portions 124-1 and 124-2, and result register 126 includes portions 126-1 and 126-2. Portion 120-1 of operand register 120 contains a single-precision value corresponding to a high-multiplicand operand (AH), and portion 120-2 of operand register 120 contains a single-precision value corresponding to a low-multiplicand operand (AL). Portion 122-1 of operand register 122 contains a single-precision value corresponding to a high-multiplier operand (BH), and portion 122-2 of operand register 122 contains a single-precision value corresponding to a low-multiplier operand (BL). Portion 124-1 of operand register 124 contains a single-precision value corresponding to a high-addend operand (CH), and portion 124-2 of operand register 124 contains a single-precision value corresponding to a low-addend operand (CL). FMACM 110 can perform the FMAC calculation using the three high operands 120-1, 122-1, 124-1 to provide a high result, (AH*BH)+CH=RH, and can perform the FMAC calculation using the three low operands 120-2, 122-2, 124-2 to provide a low result (AL*BL)+CL=RL.

Figure 2A:
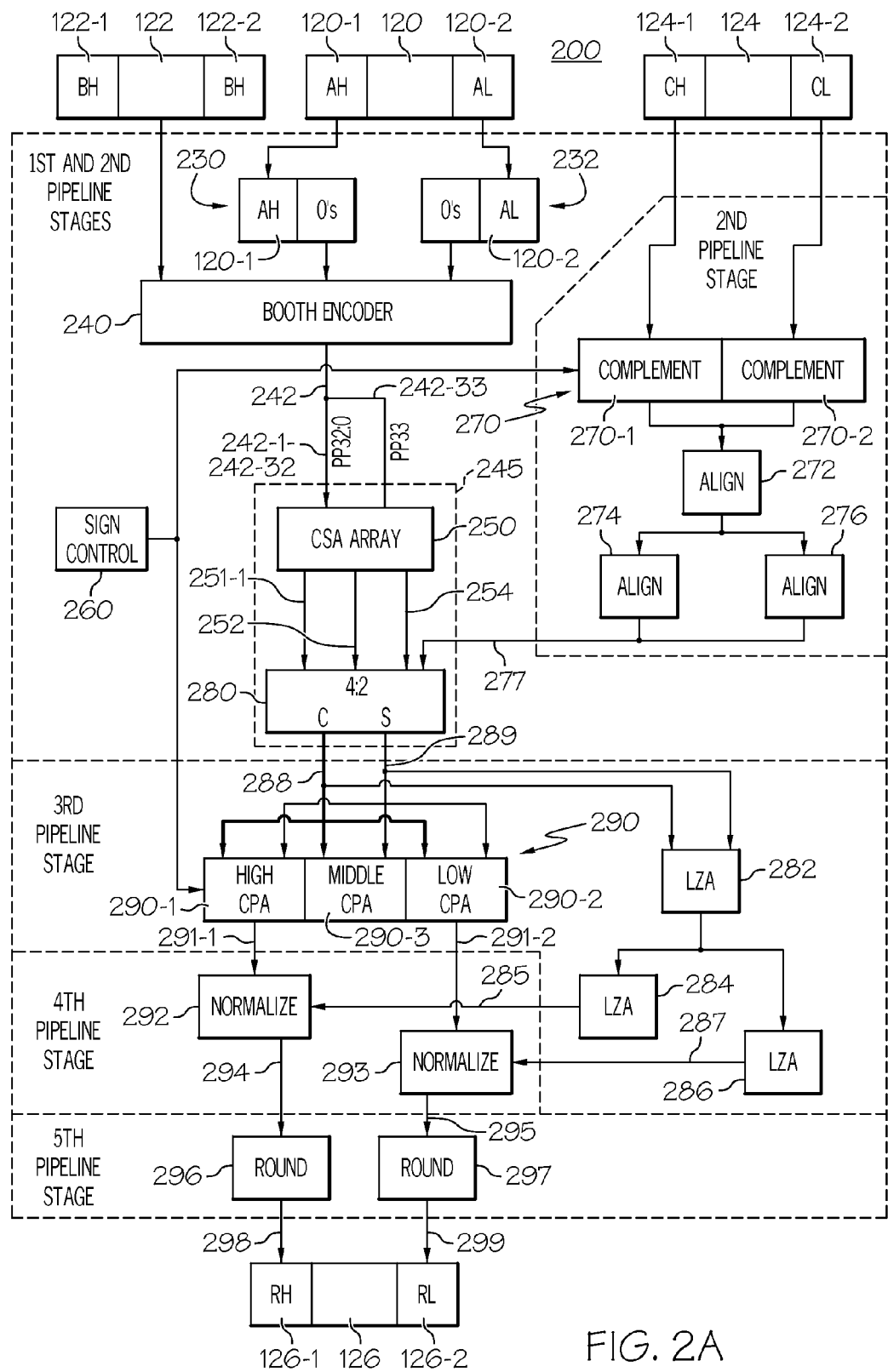
FIG. 2A is a block diagram illustrating a portion of arithmetic processing unit of FIG. 1 when configured to operate in the packed single-precision mode in accordance with a specific embodiment of the present disclosure.

FIG. 2A is a block diagram illustrating a portion 200 of arithmetic processing unit of FIG. 1 when configured to operate in the packed single-precision mode in accordance with a specific embodiment of the present disclosure. Portion 200 highlights how the mantissa datapath 114 illustrated in FIG. 1 is configured to execute two concurrent single-precision FMAC operations.

Portion 200 includes operand registers 120, 122, and 124, registers 230 and 232, a Booth encoder 240, a compression tree 245 that includes a carry-save adder (CSA) array 250 and a carry-save adder (CSA) 280, a sign control 260, a complement module 270 that includes portions 270-1 and 270-2, alignment modules 272, 274, 276, leading zero anticipator (LZA) modules 282, 284, 286, a carry-propagate adder (CPA) 290, normalizer modules 292, 293, and rounder modules 296, 297. In one implementation that is illustrated in FIG. 2A, the FMACM 110 is implemented using five pipeline stage. The first pipeline stage and the second pipeline stage includes the registers 230 and 232, the Booth encoder 240, the compression tree 245, the sign control 260, the complement module 270 that includes portions 270-1 and 270-2, and the alignment modules 272, 274, 276. During the first pipeline stage, the exponent data path 112 (not illustrated in FIG. 2A) calculates the exponent of the product, and the multiply operation begins. During the second pipeline stage, the exponent data path 112 (not illustrated in FIG. 2A) compares exponents of the product and the addend, and selects the larger of the two as a preliminary exponent of the result. The third pipeline stage includes LZA modules 282, 284, 286 and the CPA 290, which includes a high CPA 290-1, a low CPA 290-2 and a middle CPA 290-3. During the third pipeline stage, the high CPA 290-1 and the low CPA 290-2 calculate un-normalized and unrounded high and low results 291-1, 291-2, respectively, and the LZA modules 282, 284, 286 generate controls 285, 287 for normalization based on the intermediate sum and carry results 288, 289 of the multiply-add. The fourth pipeline stage includes normalizer modules 292, 293, which normalizes the un-normalized and unrounded results 290-1, 290-2 to generate normalized results 294, 295 during the fourth pipeline stage. The fifth pipeline stage includes rounder modules 296, 297, which round the normalized results 294, 295 during the fifth pipeline stage to generate IEEE-754 compliant results 298, 299 that are stored in result register 126. The result 298 corresponds to the single-precision result for the high part of the operation, whereas the result 299 corresponds to the result for the low part of the operation. Further details regarding each of the pipeline stages will now be described below.

The operand registers 120, 122, 124 and the result register 126 are described above with reference to FIG. 1, and therefore will not be described again for sake of brevity.

First and Second Pipeline Stages

As noted above, in one implementation, the FMACM 110 can be implemented using a five pipeline stages. In the first pipeline stage, portion 120-1 of operand register 120 is coupled to register 230, and portion 120-2 of operand register 120 is coupled to register 232. At registers 230, 232, two variations of the operands AH 120-1 and AL 120-2, provided by operand register 120, are prepared. Register 230 receives operand AH 120-1, and the twenty-four bits of operand AH 120-1 are left justified in 64-bit register 230, and bits 39:0 of register 230 are set to zero. Register 232 receives operand AL 120-2, and the twenty-four bits of operand AL 120-2 are right justified in 64-bit register 232, and bits 63:24 of register 232 are set to zero. During the first pipeline stage, the Booth encoder 240 of the multiplier uses a radix-4 Booth recoding technique in which the multiplier operands (AH, AL) 120-1, 120-2 and the multiplicand operands (BH, BL) 122-1, 122-2 are used to generate thirty-three partial products 342.

As illustrated in FIG. 2A, operand register 120, and registers 230, 232 are coupled to Booth encoder 240. Booth encoder 240 uses radix4 Booth recoding to generate thirty-two partial products 242-1 . . . 242-32 that are provided to CSA array 250, and to generate a thirty-third partial product 242-33 that is provided to CSA 280. In particular, Booth encoder 240 uses the contents of register 232 to calculate 12 least significant partial products 242-1 . . . 242-12, and uses the contents of register 230 to calculate 13 most significant partial products 242-13 . . . 242-20. The middle eight partial products 242-21 . . . 242-32 can be calculated using the value provided by either register 230 or 232.

Portion 124-1 of operand register 124 is coupled to portion 270-1 of complement module 270, and portion 124-2 of operand register 124 is coupled to portion 270-2 of complement module 270. Sign control 260 is also coupled to the complement modules 270-1, 270-2. If the sign control 260 indicates that an effective substract is being computed, portions 270-1 and 270-2 will "flip" the bits of their input to produce the ouput. The outputs of complement module 270 portions 270-1, 270-2 are coupled to alignment module 272.

Individual alignment controls are provided by the exponent data path 112. The exponent datapath 112 is configured to provide an alignment shift amount for CH 124-1 and CL 124-2 based upon a comparison of the exponents of operands AL 120-2, BL 122-2, and CL 124-2, and AH 120-1, BH 122-1, and CH 124-1, respectively.

Alignment module 272 is coupled to alignment modules 274, 276. Alignment modules 272, 274, 276 are configured to shift the addends 124-1, 124-2 so that their values are aligned to corresponding significant bits of the products, as determined by comparing the values of the exponents of INPUT3 to the values of the product exponents determined by the exponents of INPUT1 and INPUT2. In particular, alignment module 272 is used to perform a fine-grained shift of shift by zero to 15 bit positions to the right, where the upper and lower bits of the shifter are controlled independently. Alignment modules 274, 276 are dedicated for use in the packed-single mode of operation and complete the shift by performing shifts by multiples of 16. When the output of alignment module 274 exceeds 48 bits, the bits in excess of 48 can be provided to an incrementer (not illustrated) that is part of CPA 290-1, and similarly, when the output of alignment module 276 exceeds 48 bits, the bits in excess of 48 can be provided to an incrementer (not illustrated) that is part of CPA 290-2. The output 277 of alignment modules 274, 276 is coupled to CSA 280. The output 277 that is generated by the alignment modules 274, 276 is an aligned addend. The aligned addend 277 is a shifted version of the C input 124 that represents two shifted results (one for bits 127:80 and another for bits 47:0) in which the respective outputs of alignment module 274 and alignment module 276 are reassembled into a packed format.

Booth encoder 240 is coupled to CSA array 250 and to CSA 280. Together, the CSA array 250 and CSA 280 are used to implement a compression tree 245 (or "carry-save adder Wallace tree"). In general, the compression tree 245 is used to compress the thirty-three partial products 241-1 . . . 241-33 to generate intermediate and carry 288 and sum 289 results Further details regarding the compression tree 245 in accordance with the disclosed embodiments will be described below with reference to FIG. 3.

Third Pipeline Stage

Referring to FIG. 2A, during the third pipeline stage, portions of the intermediate sum 289 and carry 288 results of the multiply-add that are generated by CSA 280 are provided to a CPAs 290-1, 290-2. CPAs 290-1, 290-2 calculate un-normalized and unrounded results 291-1, 291-2. In parallel with the CPAs 290-1, 290-2, LZAs 282, 284, 286 operate on the same intermediate sum 289 and carry 288 results to produce controls for normalization.

Figure 2B:
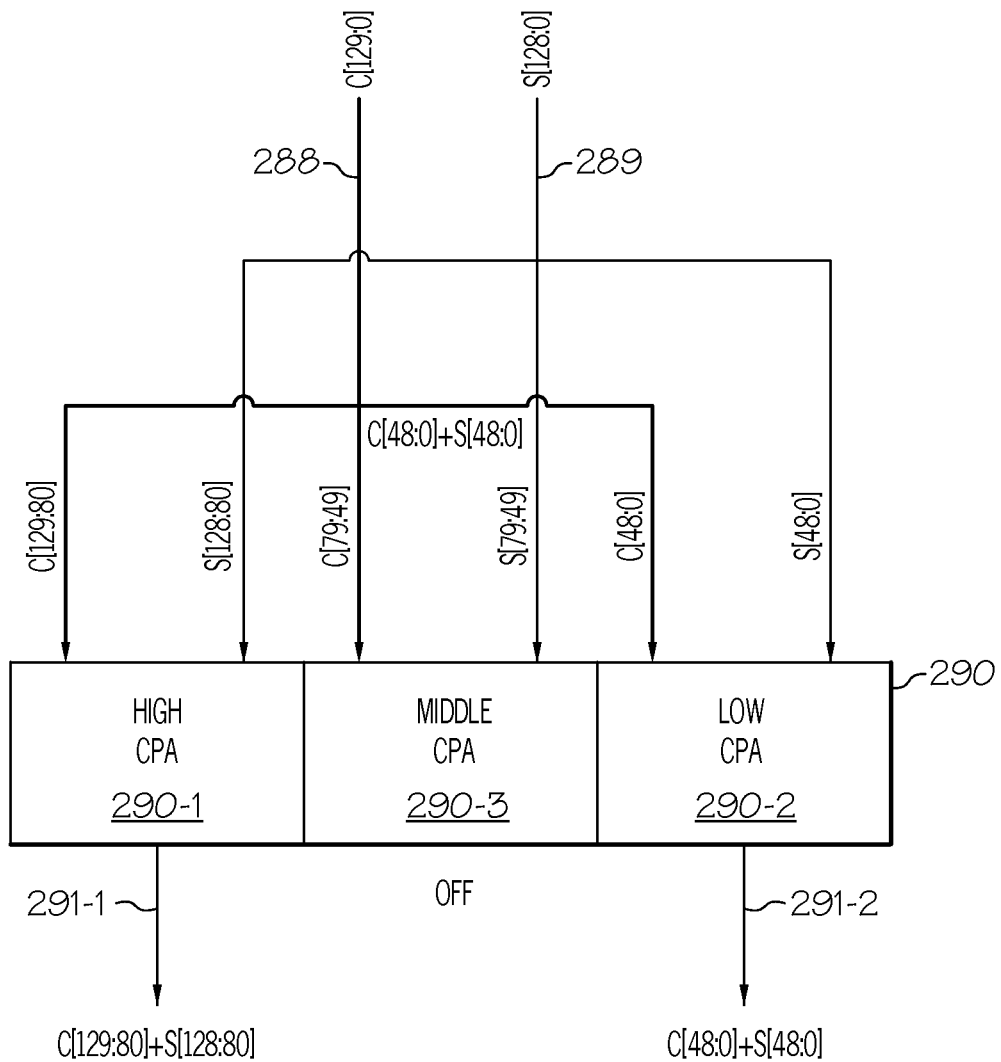
FIG. 2B is a block diagram illustrating the carry-propagate adder (CPA) of FIG. 2A in accordance with a specific embodiment of the present disclosure.

FIG. 2B is a block diagram illustrating the carry-propagate adder (CPA) 290 of FIG. 2A in accordance with a specific embodiment of the present disclosure. In accordance with one embodiment, as illustrated in FIG. 2B, the CPA 290 has three CPAs 290-1 . . . 290-3, which are referred to as high, low and middle CPAs 290-1, 290-2, 290-3, respectively. The CPA 290 is coupled to the sign control 260. The high CPA 290-1 calculates a high un-normalized result, and the CPA 290-2 calculates a low un-normalized result. The middle portion 290-3 is switched off and not used during the FMAC operation. As will be explained below, each of the high and low portions 290-1, 290-2 independently operates on a different parts of the intermediate sum 289 and carry 288 results. In this particular implementation, the low CPA 290-2 adds bits 0 through 48 (C[48:0]) of the intermediate carry result 288 to bits 0 through 48 (S[48:0]) of the intermediate sum result 289 to generate an un-normalized and unrounded low result 291-2, whereas the high CPA 290-1 adds bits 80 through 129 (C[129:80]) of the intermediate carry result 288 to bits 80 through 128 (S[128:80]) of the intermediate sum result 289 without requiring information from the low CPA 290-2 or the middle CPA 290-3 to generate an un-normalized and unrounded high result 291-1. Further details as to why this is possible will be provided below.

A carry into either or both of portions 290-1 and 290-2 may be performed based on whether either or both operations, respectively, is an effective subtract. Therefore, sign control 260 can specify that a carry is to be injected not only into bit zero, the least significant bit of portion 290-1, but also into bit eighty, the least significant bit of portion 290-2, during the carry-propagate calculation.

LZAs 282, 284, 286 operate in parallel with CPAs 290-1, 290-2, and predict the number of leading zeros that will be present in the results output by CPAs 290-1, 290-2. Leading zero anticipation generally includes two tasks: generation of a leading zero value, and priority encoding of that value to find the bit position of the first "1." The LZA module 282 generates the LZA value. The LZA module 282 is coupled to LZA module 284 and LZA module 286. The upper portion of that LZA value, corresponding to the high result, is passed to LZA module 284 for priority encoding, and the lower portion of the LZA value, corresponding to the low result, is passed to LZA module 286 for priority encoding.

CPA 290-1 and LZA 284 are coupled to normalizer module 292, whereas CPA 290-2 and LZA 286 are coupled to normalizer module 293.

Fourth Pipeline Stage

During the fourth pipeline stage, the un-normalized results calculated by the CPAs 290-1, 290-2 are normalized. More specifically, normalizer module 292 receives the high un-normalized and unrounded high result from high CPA 290-1 of CPA 290, and the leading zero prediction from LZA 284. The normalizer module 292 uses these inputs to generate a high normalized, un-rounded result 291-2, which it passes to rounder module 296. In other words, the normalizer module 292 normalizes the high un-normalized and unrounded high result from the high CPA 290-1, based on the leading zero prediction from LZA 284, to produce the high normalized, un-rounded result.

Normalizer module 293 receives the low un-normalized and unrounded result from the low CPA 290-2 of CPA 290, and the leading zero prediction from LZA 286. The normalizer module 293 uses these inputs to generate a low normalized, un-rounded result 291-2, which it passes to rounder module 297. In other words, the normalizer module 293 normalizes the low un-normalized and unrounded low result from low CPA 290-2, based on the leading zero prediction from LZA 286, to produce the low normalized, un-rounded result.

Fifth Pipeline Stage

During the fifth pipeline stage, the normalized results from the normalizer modules 292, 293 are rounded.

More specifically, normalizer module 292 is coupled to a first rounder module 296, which performs a rounding operation on or "rounds" the high (single value) un-rounded result from normalizer module 292 to generate a final high rounded result. Rounder module 296 is coupled to portion 126-1 of result register 126, and the final high rounded result from rounder module 296 is passed to (or placed in or provided to) portion 126-1 of result register 126. Similarly, normalizer module 293 is coupled to a second rounder module 297, which performs a rounding operation on or "rounds" the low (single value) un-rounded result from normalizer module 293 to generate a final low rounded result. Rounder module 297 is coupled to portion 126-2 of result register 126, and the final low rounded result from rounder module 297 is passed to (or placed in or provided to) portion 126-2 of result register 126.

Although not illustrated in FIG. 2A, the high CPA 290-1, normalizer module 292, and rounder module 296 can provide a carry-out value to the exponent datapath 112 to increment the exponent of the result, and the low CPA 290-2, normalizer module 293, and rounder module 297 can provide a carry-out value to the exponent datapath 112 to increment the exponent of the result.

Although not illustrated in FIG. 2A, it is noted that in addition to the mantissa datapath 114, there is a parallel exponent datapath 112 to compute the exponent. Each register and operator in the exponent datapath is divided into two portions: a high portion corresponding to the "high" result and a low portion corresponding to the "low" result. For instance, a carry-out of either or both of the high and low mantissa results can occur during the operation of rounder modules 296 and 297. Both the high portion and the low portion of the result exponent can be independently incremented appropriately.

Problem with Conventional Compression Tree

As described above, the FMACM 110 can perform the FMAC calculation using the three high operands 120-1, 122-1, 124-1 to provide a high result, (AH*BH)+CH=RH, and can perform the FMAC calculation using the three low operands 120-2, 122-2, 124-2 to provide a low result (AL*BL)+CL=RL.

In a conventional compression tree, the CPA 290 does not include a middle CPA 290-3, and is divided into a high CPA 290-1 and a low CPA 290-2. The low CPA 290-2 can perform the computation of the sum of the low-part of the carry output 288 (C) and the sum output 289 (S) can be performed with respect to the first 80-bits (i.e., bits 0 . . . 79) of each as represented in equation (1) as follows:

$$(C+S)[79:0]=AL*BL+f(CL) \quad \text{Equation (1)},$$

where AL is the low-multiplicand operand, BL is the low-multiplier operand, CL is low-addend operand, and where f(CL) is some function on CL. Thus, with respect to the low-part, sum ((C+S)[79:0]) of the low-part of the carry output 288 (C) and the low-part of the sum output 289 (S) are related as shown in equation (1). The 130-bit carry output 288 (C) and the 129-bit sum output 289 (S) also have the following property illustrated in equation (2) as follows:

$$(C+S)=2^{128}(AH*BH+g(CH))*2^{80}+(AL*BL+f(CL))) \quad \text{Equation (2)},$$

where AH is the high-multiplicand operand, BH is the high-multiplier operand, CH is the high-addend operand, and where g(CH) is some function on CH. To exploit this relationship, it is desirable to compute the result of equation (3) (below) as quickly as possible.

$$AH*BH+g(CH) \quad \text{Equation (3)}$$

However, in the conventional design, when the FMACM 110 operates in the packed-single mode, the computation of the low result (AL*BL+f(CL)) must complete prior to computation of the high result (AH*BH+g(CH)) since the compression of the low and/or middle result may or may not cause the changes to the compression during computation of the high result. To explain further, in conventional design, for the result that is generated by the high CPA 290-1 to be correct, the carry portion of output 291-1 that is generated by the low CPA 290-2 needs to be accounted for during the calculation at high CPA 290-1. As such, the compression that takes place during computation of the low and middle portions of the result (AL*BL+f(CL)) must finish so that the effect that its compression will have during computation of the high portion of the result (AH*BH+g(CH)) by CPA 290-1 is known prior to computing the high result (AH*BH+g(CH)) so that the computation will be correct. As such, in a conventional design, to compute the high portion of the result (AH*BH+g(CH)), computation of the low portion of the result (AL*BL+f(CL)) must finish first because knowledge of the carry-out from these low portion of the result must be used during the computation of the high portion of the result (AH*BH+g(CH)). This adds a delay to the overall computation.

The disclosed embodiments provide a CSA array 250 that can speed up the computation of the high result without these drawbacks. Further details regarding the CSA array 250 of the compression tree architecture 245 in accordance with the disclosed embodiments will now be described below with reference to FIG. 3.

Figure 3:
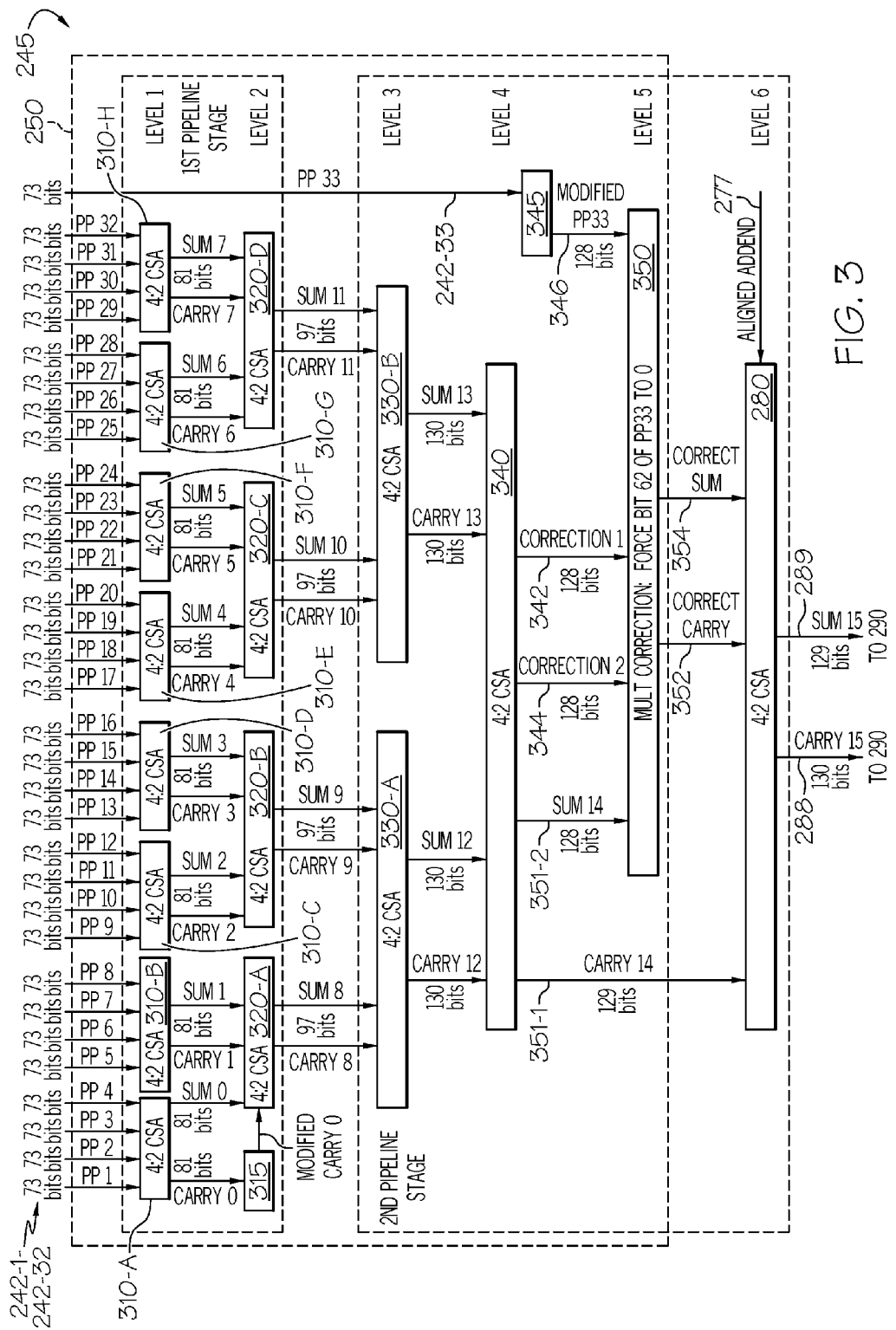
FIG. 3 is a block diagram illustrating a compression tree architecture of FIG. 2A that is configured to operate in accordance with a specific embodiment of the present disclosure.

FIG. 3 is a block diagram illustrating in further detail a compression tree 245 architecture of the portion 200 of the FMACM 110 of FIG. 2A that is configured to operate in accordance with a specific embodiment of the present disclosure. As illustrated in FIGS. 2 and 3, the compression tree 245 includes the carry-save adder (CSA) array 250 coupled the CSA 280. The compression tree 245 receives 2N+1 partial product 242-1 . . . 242-33 as its inputs. In the following example which illustrates one exemplary implementation, it is assumed that N is equal to sixteen and that there are thirty-three partial products 242-1 . . . 242-33.

As will be explained in greater detail below, the compression tree 245 in accordance with the disclosed embodiments, adds a logical one (1) to the least significant bit of high-part result in the early stages of the "compression." In one particular implementation, a logical one (1) is forced in at bit 80 during a second compression level (LEVEL 2). Then, in a later (fifth) stage of compression (LEVEL 5), a specific bit in a specific partial product that is input to the compression tree forced to be a logical zero (0). For example, in one exemplary implementation, in the fifth level (LEVEL 5) of compression, bit 62 of the 33rd partial product 242-33 is forced to be zero.

The carry-save adder (CSA) array 250 includes four compressor levels (LEVELS 1 . . . 4) that are used to reduce the thirty-two partial products 242-1 . . . 242-32 and the thirty-third partial product 242-33 to a 129-bit carry vector 351-1 and a 128-bit sum vector 351-2 that represent the sum of the 33 partial products. Compressor levels (LEVEL 1, LEVEL 2) are part of the first pipeline stage, and compressor levels (LEVEL 3, LEVEL 4) are part of the second pipeline stage.

The first compressor level (LEVEL 1) includes eight 4:2 carry-save adders 310-A . . . 310-H and a modification module 315. Each 4:2 carry save adder receives four inputs and compresses them into a carry output and a sum output such that (1) the sum of the carry output and the sum output will be equal to (2) the sum of the four inputs. As such, in the first compressor level (LEVEL 1), each of the 4:2 carry-save adders 310-A . . . 310-H receives four partial products 242 and compresses them to generate a carry output and a sum output. Each of the partial products 241-1 . . . 241-32 that is input to the compression tree 245 is a bit vector that includes 73 bits (or is "73 bits wide"). For instance, 4:2 carry-save adder 310-A receives four partial products 242-1 . . . 242-4 and compresses them to generate a carry output 0 and a sum output 0, whereas 4:2 carry-save adder 310-B receives four partial products 242-5 . . . 242-8 and compresses them to generate a carry output 1 and a sum output 1. Each of the carry and sum outputs generated by the 4:2 carry-save adders 310-A . . . 310-H in the first compressor level (LEVEL 1) is 81 bits (or is "81 bits wide").

When the FMACM 110 is configured to perform a multiply-and-accumulate operation on operands having packed single-precision format, in accordance with one exemplary implementation of the disclosed embodiments, one of the first outputs (carry or sum) generated by the carry-save adders 310-A . . . 310-H in the first compressor level (LEVEL 1) can be selected, and a least significant bit of the selected output is changed from a logical zero (0) value to a logical one (1) value to generate a modified first output. In one embodiment, the least significant bit is bit 80, and therefore bit 80 is set to a logical one (1) value to add a $2^{80}$ term to the selected output such that the modified first output has an extra $2^{80}$ term. For example, in one non-limiting example, the least significant bit is bit 80 of the selected output, and therefore bit 80 of the selected output can be set to a logical one (1) value to add a $2^{80}$ term to the selected output such that the modified output has an extra $2^{80}$ term. For instance, in one non-limiting implementation, the least significant bit is bit 80 of the first carry output (e.g., CARRY 0 output from CSA 310-A or CARRY 1 output from CSA 310-B), and therefore bit 80 of the first carry output is set to a logical one (1) value to add a $2^{80}$ term to the first carry output such that the modified first carry output has an extra $2^{80}$ term. Alternatively, in another non-limiting implementation, when the least significant bit is bit 80 of the first sum output (e.g., SUM 0 output from CSA 310-A or SUM 1 output from CSA 310-B), bit 80 of the first sum output can be switched or set to a logical one (1) value to add a $2^{80}$ term to the first sum output such that the modified first sum output has an extra $2^{80}$ term.

FIG. 3 illustrates exemplary implementation in which the carry 0 output generated by 4:2 carry-save adder 310-A is modified by the modification module 315 such that bit 80 of carry output 0 is set to a logical one (1) to generate a modified carry output 0. In this particular implementation, by setting bit 80 of carry output 0 to a logical one (1), a $2^{80}$ term is added to a carry output 0 at the second compressor level (LEVEL 2). The 4:2 carry-save adder 310-A compresses the PP1 . . . PP4 inputs 242-1 . . . 242-4 into two 81-bit output vectors whose sum is equal to the sum of the PP1 . . . PP4 inputs 242-1 . . . 242-4. By setting bit 80 of carry output 0 to a logical one (1), this effectively adds a $2^{80}$ term into the inputs, and the modified carry output 0 correspondingly has an extra $2^{80}$ term. It is noted that in other alternative embodiments, the same results can be achieved by adding the $2^{80}$ term into other outputs of the first compressor level (LEVEL 1) by setting a particular bit in one of those outputs to a logical (1).

The second compressor level (LEVEL 2) includes four 4:2 carry-save adders 320-A . . . 320-D. Each of the 4:2 carry-save adders 320-A . . . 320-D receives two carry inputs and two sum inputs, and compresses them to generate a carry output and a sum output. For instance, 4:2 carry-save adder 320-A receives modified carry output 0, sum output 0, carry output 1 and sum output 1, and compresses them to generate a carry output 8 and a sum output 8, whereas 4:2 carry-save adder 320-B receives carry output 2, sum output 2, carry output 3 and sum output 3 and compresses them to generate a carry output 9 and a sum output 9. Each of the carry and sum outputs generated by the carry-save adders 320-A . . . 320-D in the second compressor level (LEVEL 2) is 97 bits (or is "97 bits wide").

The third compressor level (LEVEL 3) includes two 4:2 carry-save adders 330-A, 330-B. Each of the 4:2 carry-save adders 330-A, 330-B receives two carry inputs and two sum inputs, and compresses them to generate a carry output and a sum output. For instance, 4:2 carry-save adder 330-A receives modified carry output 8, sum output 8, carry output 9 and sum output 9, and compresses them to generate a carry output 12 and a sum output 12, whereas 4:2 carry-save adder 330-B receives carry output 10, sum output 10, carry output 11 and sum output 11 and compresses them to generate a carry output 13 and a sum output 13. Each of the carry and sum outputs generated by the carry-save adders 330-A, 330-B in the third compressor level (LEVEL 3) is 130 bits (or is "130 bits wide").

The fourth compressor level (LEVEL 4) includes a 4:2 carry-save adder 340. The 4:2 carry-save adder 340 receives two carry inputs and two sum inputs, and compresses them to generate a carry output 351-1 and a sum output 351-2. For instance, the 4:2 carry-save adder 340 receives carry output 12, sum output 12, carry output 13 and sum output 13 and compresses them to generate a carry output 14 and a sum output 14. The carry output 14 and sum output 14 generated by the 4:2 carry-save adder 340 in the fourth compressor level (LEVEL 4) is 128 bits (or is "128 bits wide").

The fifth compressor level (LEVEL 5) includes a partial product modification module 345 and a multiplication correction module 350. The partial product modification module 345 receives the thirty-third partial product 242-33 from Booth encoder 240. In accordance with the disclosed embodiments, the partial product modification module 345 receives the thirty-third partial product 242-33, which is a bit vector that includes 128 bits. Bit 62 of the thirty-third partial product 242-33 is a sign bit of partial product 31 242-31. When the partial product modification module 345 determines that bit 62 of the thirty-third partial product 242-33 has a logical zero (0) value, the partial product modification module 345 simply passes the thirty-third partial product 242-33 to multiplication correction module 350 as partial product 346. By contrast, when the partial product modification module 345 determines that bit 62 of the thirty-third partial product 242-33 has a logical one (1) value, the partial product modification module 345 modifies bit 62 of the thirty-third partial product 242-33 to a logical zero (0) value to generate a modified version 346 of the thirty-third partial product 242-33. It is noted that bit 62 is used as one example, and that in other alternative embodiments, instead of modifying bit 62 of the thirty-third partial product 242-33 to a logical zero (0) value, other bits between 49 and 79 (instead of bit 62) can be changed from a logical one (1) value to a logical zero (0) value to effectively accomplish the same result. In still other alternative embodiments, instead of modifying bit 62 of the thirty-third partial product 242-33 to a logical zero (0) value, a value can be subtracted at the multiplication correction module 350 to effectively accomplish the same result. In other words, it is equivalent to turn any bit between 49 and 79 from a logical one (1) value to logical zero (0) value.

The multiplication correction module 350 is another 4:2 carry-save adder that receives sum output 14 351-2 that was generated by the 4:2 carry-save adder 340, a first correction factor 342, a second correction factor 344, and partial product 346. Although not illustrated, the FMACM 110 generates the first correction factor 342 based on the operand 120, and generates the second correction factor 344 based on the operand 122. The multiplication correction module 350 and compresses these inputs to generate a corrected carry output 352 and a corrected sum output 354.

The sixth compressor level (LEVEL 6) includes CSA 280. CSA 280 is another 4:2 carry-save adder coupled to the CSA array 250. CSA 280 receives carry output 14 that were generated by the 4:2 carry-save adder 340, the corrected carry output 352 and the corrected sum output 354 that were generated by the multiplication correction module 350, and the aligned addend 277 generated by the alignment modules 274, 276 that are coupled to CSA 280. CSA 280 compresses the carry output 14, the corrected carry output 352, the corrected sum output 354 and the aligned addend 277 to generate a 130-bit carry output 288 that is provided to high CPA 290-1 of CPA 290 and to leading zero anticipator (LZA) 282, and a 129-bit sum output 289 that is provided to low CPA 290-2 of CPA 290 and to LZA 282.

Carry Modification, Partial Product Modification and Multiplication Correction

The inventors observed that when bit 80 of carry output 0 is set to a logical one (1) (to generate the modified carry output 0) and when bit 62 of the thirty-third partial product 242-33 is set to a logical zero (0) value (to generate the modified version 346 of the thirty-third partial product 242-33) this can allow for the 130-bit carry output 288 (C) and the 129-bit sum output 289 (S) to be computed in significantly less time since the high-part (C[129:80]+S[128:80]) 291-1 can be computed by the high CPA 290-1 without waiting for the low CPA 290-2 to complete its computation of the low-part (C[48:0]+S[48:0]) 291-2. The underlying reasons will be described below.

If there is a way to ensure that the low-part 291-2 that is computed at the low CPA 290-2 complies with equation (4):

$$C[48:0]+S[48:0]=(C+S)[48:0] \qquad \text{Equation (4)},$$

then the high-part 291-1 can be computed at the high CPA 290-1 as illustrated in equations (5) and (6).

$$C[129:80]+S[128:80]*2^{80}=(C+S)-(C[79:0]+S[79:0]) \qquad \text{Equation (5)}$$

$$=2^{128}+(AH*BH+g(CH))*2^{80}. \qquad \text{Equation (6)}$$

However, the inventors also discovered that in a conventional design, Equation (4) is not always true since equation (4) (i.e., C[79:0]+S[79:0]) can be equal to either AL*BL+f (CL) or AL*BL+f(CL)+$2^{80}$ as shown in equations (7) and (8) below.

$$C[79:0]+S[79:0]=AL*BL+f(CL) \qquad \text{Equation (7)}$$

$$C[79:0]+S[79:0]=AL*BL+f(CL)+2^{80} \qquad \text{Equation (8)}.$$

As such, when the lower 80 bits [79:0] are added together, in some cases it will result in a carry that should be accounted for during computation of the high result so that the high result is computed correctly. Accordingly, it is necessary to have a mechanism in place to ensure that a carry gets added into bit 80 during the compression steps that are used to generate the high result when appropriate so that the high result can be computed correctly without waiting for computation of the low result to finish.

In accordance with the disclosed embodiments, the modification module 315, partial product modification module 345 and multiplication correction module 350 are not implemented, to speed up the multiplication computation since this allows the computation of the high-part to proceed without completion of the computation of the low-part since the effect of the compression of the low-part has already been taken into account when generating the compressed output in the high-part by modifying bit 80 of a selected one of the outputs from the first compression level to a logical one (1) value at the modification module 315. Because the FMAC does not need to wait for compression of the low-part 290-2 to complete before computing the high-part 290-1, the high-part 290-1 can be directly added to the low-part 290-1 and the entire computation is faster. In addition, the middle CPA 290-3 is not need and can be turned off, which improves efficiency. To explain further, when the compression tree 245 is modified to include the modification module 315, partial product modification module 345 and multiplication correction module 350, the sum of the high parts of the 130-bit carry output 286 (C) and the 129-bit sum output 289 (S) can be represented as shown in equation (9) as follows:

$$(C+S)2^{128}+(AH*BH+g(H))*2^{80}+(2^{80}-2^{62}*PPS31)+ \\ AL*BL+f(CL) \qquad \text{Equation (9)},$$

where the term $2^{80}$ is controlled or added in by the modification module 315, the term $2^{62}$ is controlled by partial product modification module 345, and where PPS31 is the sign bit of partial product 31 242-31. As noted above, bit 62 of the thirty-third partial product 242-33 is the sign bit of partial product 31 242-31. When sign bit of partial product 31 242-31 (PPS31) is equal to zero (0), then it can be proven that:

$$C[79:0]+S[79:0]=2^{80}+(C+S)[79:0]=2^{80}+AL*BL+f \\ (CL). \qquad \text{Equation (10)}$$

As a result the expression: $2^{128}+(AH*BH+g(H))*2^{80}$ can be computed by the high CPA 290-1 simply as shown in expressions (11) and (12) as follows:

$$C[129:80]+S[128:80] \qquad \text{Expression (11)}$$

$$(C[129:80]+S[128:80])*2^{80} \qquad \text{Expression (12)}.$$

On the other hand, when sign bit of partial product 31 242-31 (PPS31) is equal to one (1), then it can be proven that:

$$C[79:0]+S[79:0]=(C+S)[79:0]=2^{80}-2^{62}+AL*BL+f \\ (CL) \qquad \text{Equation (13)}.$$

This allows the expression $2^{128}+(AH*BH+g(H))*2^{80}$ to be computed by the high CPA 290-1 simply as shown in expressions (14) and (15) as follows:

$$C[129:80]+S[128:80] \qquad \text{Expression (14)}$$

$$(C[129:80]+S[128:80])*2^{80} \qquad \text{Expression (15)}$$

Thus, the high CPA-290-1 can be used to accurately add only the high parts C[129:80] and S[128:80] (i.e., bits 80 . . . 129) without having to wait for a carry out from the middle CPA 290-3 and lower CPA 290-2.

Thus, the disclosed embodiments can be used to predict or pre-compute the effect that compression of the low-part and middle-part of the partial products will have during compression to the high-part of the partial products, and then to compensate for that contribution during the compression of the high-part of the partial products. In one implementation, compensation involves forcing a logical one (1) in at bit 80 during a second compression level (LEVEL 2), and forcing bit 62 of the 33rd partial product 242-33 to be zero during in the fourth level (LEVEL 4) of compression. When the logical one (1) is forced in at bit 80 during a second compression level (LEVEL 2), and bit 62 of the 33rd partial product 242-33 is forced to be zero in the fourth level (LEVEL 4) of compression, the computation of the 130-bit carry output 288 (C) and the 129-bit sum output 289 (S) can be simplified such that the computation of the high-part (e.g., high-part of packed single FMAC operation) does not require completion of the computation of the low-part. For example, when computing the multiplication result of the high-part, the high-parts of two output bit vectors can be added without first monitoring the carry out that results from adding the middle-parts and low-parts of the two output bit vectors. This compensation technique allows for the high-parts to be computed without waiting for compression information regarding the low-parts and middle-parts. This effectively speeds up the overall FMAC operation since the computation of the high-part of the result can be performed without waiting for the computation of the low-part to complete.

Thus, the disclosed embodiments can speed up computation of the high-part portion during a packed single-precision FMAC operation. Because the high single-precision result can be computed in less time cycle delay can be reduced. Some of the other advantages of this approach include reduced silicon area since there is no need for an extra adder for pre-computing the high-part-sum+1 result. In addition, flip-flops (or latches) in the middle section of the compression tree that hold the intermediate result of the middle section compression can be left off since compression of the middle section does not need to be performed thereby reducing power consumption.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for compressing a plurality of partial products comprising a last partial product during a fused multiply-and-accumulate operation executed on a fused multiply-and-accumulate unit of a processor, the method comprising:
in the fused multiply-and-accumulate unit of the processor, performing operations for:
compressing, during a first compression stage, the plurality of partial products except for the last partial product to generate first outputs;
changing a particular bit of a selected one of the first outputs from a logical zero value to a logical one value to generate a modified first output;
compressing, during a second compression stage, the modified first output and other unmodified ones of the first outputs to generate second outputs;
compressing, during a third compression stage, the second outputs to generate third outputs;
compressing, during a fourth compression stage, the third outputs to generate a fourth carry output and a fourth sum output; and
generating an intermediate partial product based on the last partial product, wherein the intermediate partial product is the last partial product when a specific bit in the last partial product has a logical zero value, and when the specific bit in the last partial product has a logical one value, wherein the specific bit in the last partial product is changed to be a logical zero value during generation of the intermediate partial product.

2. A method according to claim 1, wherein changing a particular bit of a selected one of the first outputs from a logical zero value to a logical one value to generate a modified first output, comprises:
setting the particular bit of the selected one of the first outputs to the logical one value to add a logical one value into the modified first output.

3. A method according to claim 2, wherein the first outputs comprises a first carry output and a first sum output, wherein the particular bit is a least significant bit of the first carry output, and wherein the modified first output is a modified first carry output.

4. A method according to claim 3, wherein the least significant bit is bit 80 of the first carry output, and wherein setting the particular bit of the selected one of the first outputs to a logical one value to add a logical one value into the modified first output, comprises:
setting bit 80 of the first carry output to a logical one value to add a $2^{80}$ term to the first carry output such that the modified first carry output has an extra $2^{80}$ term.

5. A method according to claim 1, wherein the specific bit in the last partial product is a sign bit of the last partial product.

6. A method according to claim 5, wherein the specific bit in the last partial product is a specific bit in the last partial product that is selected from bits 49 through 79 of the last partial product.

7. A method according to claim 5, wherein the plurality of partial products comprise thirty-three partial products, wherein the last partial product is a thirty-third partial product, wherein the specific bit is bit 62 of the thirty-third partial product.

8. A method according to claim 1, further comprising:
compressing a first correction factor, a second correction factor, the intermediate partial product and the fourth sum output to generate a corrected carry output and a corrected sum output.

9. A method according to claim 8, further comprising:
generating, during a sixth compression stage, a carry output and a sum output based on an aligned addend, the fourth carry output, the corrected carry output, and the corrected sum output.

10. A fused multiply-and-accumulate processor, comprising:
a compression tree configured to receive a plurality of partial products that comprise a last partial product, comprising:
a carry-save adder array having inputs configured to receive the plurality of partial products, the CSA array comprising:
a first compressor level comprising: a plurality of first carry-save adders that are configured to compress the plurality of partial products except for the last partial product to generate first outputs;
a modification module designed to change a particular bit of a selected one of the first outputs from a logical zero value to a logical one value to generate a modified first output;
a second compressor level comprising a plurality of second carry-save adders that are configured to compress the modified first output and other unmodified ones of the first outputs to generate second outputs;
a third compressor level comprising a plurality of third carry-save adders that are configured to compress the second outputs to generate third outputs;
a fourth compressor level comprising a fourth carry-save adder that is configured to compress the third outputs to generate a fourth carry output and a fourth sum output; and
a partial product modification module that is configured to generate an intermediate partial product based on the last partial product, and when the specific bit in the last partial product has a logical one value, wherein the partial product modification module is configured to change the specific bit in the last partial product to a logical zero value during generation of the intermediate partial product.

11. A fused multiply-and-accumulate processor according to claim 10, wherein the plurality of first carry-save adders comprises eight first carry-save adders that include the first carry-save adder, wherein each of the first plurality of first carry-save adders is configured to:
receive four of the plurality of the partial products and compress the four partial products to generate a carry output and a sum output, wherein the sum of the carry output and the sum output generated by each particular one of the eight first carry-save adders is equal to the sum of the four partial products input to that particular one of the eight first carry-save adders.

12. A fused multiply-and-accumulate processor according to claim 11, wherein the plurality of partial products comprise thirty-three partial products, wherein the last partial product is a thirty-third partial product.

13. A fused multiply-and-accumulate processor according to claim 11, wherein the second plurality of second carry-save adders comprise:
a particular one of the second plurality of second carry-save adders that is configured to compress three of the first outputs and the modified first output to generate two second outputs such that the logical one value is forced into the particular bit by the particular one of the second plurality of second carry-save adders.

14. A fused multiply-and-accumulate processor according to claim 10, wherein the modification module is designed to:
set the particular bit of the selected one of the first outputs to a logical one value to add a logical one value into the modified first output.

15. A fused multiply-and-accumulate processor according to claim 14, wherein the first outputs comprises a first carry output and a first sum output, wherein the particular bit is a least significant bit of the first carry output generated by the first carry-save adder, and wherein the modified first output is a modified first carry output.

16. A fused multiply-and-accumulate processor according to claim 15, wherein the least significant bit is bit 80 of the first carry output, and wherein setting bit 80 of the first carry output to a logical one value adds a $2^{80}$ term to the first carry output such that the modified first carry output has an extra $2^{80}$ term.

17. A fused multiply-and-accumulate processor according to claim 10, wherein the intermediate partial product generated by the partial product modification module is the last partial product when the specific bit in the last partial product has a logical zero value.

18. A fused multiply-and-accumulate processor according to claim 10, wherein the specific bit in the last partial product is a sign bit of the last partial product.

19. A fused multiply-and-accumulate processor according to claim 18, wherein the specific bit in the last partial product is a specific bit in the last partial product that is selected from bits 49 through 79 of the last partial product.

20. A fused multiply-and-accumulate processor according to claim 18, wherein the specific bit in the last partial product is bit 62 in the last partial product.

21. A fused multiply-and-accumulate processor according to claim 18, wherein the last partial product is a thirty-third partial product.

22. A fused multiply-and-accumulate processor according to claim 18, wherein the CSA array further comprises:
a fifth compressor level comprising:
a multiplication correction module that is configured to generate a corrected carry output and a corrected sum output based on a first correction factor, a second correction factor, the intermediate partial product and the fourth sum output.

23. A fused multiply-and-accumulate processor according to claim 22, wherein the multiplication correction module comprises:
a carry-save adder that compresses the first correction factor, the second correction factor, the intermediate partial product and the fourth sum output to generate the corrected carry output and the corrected sum output.

24. A fused multiply-and-accumulate processor according to claim 22, wherein the compression tree further comprises:
a sixth compressor level a sixth carry-save adder coupled to the CSA array and being configured to generate a carry output and a sum output based on an aligned addend, the fourth carry output, the corrected carry output, and the corrected sum output.

25. A fused multiply-and-accumulate processor according to claim 10, wherein the fused multiply-and-accumulate processor is configured to receive operands having packed single-precision format, and is configured to perform a multiply-and-accumulate operation on the operands, wherein the operands comprise:
a high-multiplicand operand (AH) and a low multiplicand operand (AL), a high-multiplier operand (BH) and a low-multiplier operand (BL), and a high-addend operand (CH) and a low-addend operand (CL).

26. A fused multiply-and-accumulate processor according to claim 25, further comprising:
a register configured to receive a single-precision value corresponding to the high multiplicand operand (AH);
a register configured to receive and a single-precision value corresponding to the low multiplicand operand (AL); and
a Booth encoder comprising: a first input configured to receive a single-precision value corresponding to the high-multiplier operand (BH), and a single-precision value corresponding to the low-multiplier operand (BL); and a second input configured to receive a first value generated based on the single-precision value corresponding to the low multiplicand operand (AL) and a second value generated based on the single-precision value corresponding to the low-multiplicand operand (AL), and
wherein the Booth encoder is configured to generate the plurality of partial products based on the single-precision value corresponding to the high-multiplier operand (BH), the single-precision value corresponding to the low-multiplier operand (BL), the first value and the second value.

* * * * *